(12) United States Patent
Shimamoto et al.

(10) Patent No.: US 8,846,900 B2
(45) Date of Patent: Sep. 30, 2014

(54) CELLULOSE DIACETATE FOR RETARDATION FILM

(75) Inventors: Shu Shimamoto, Himeji (JP); Yuya Asumi, Himeji (JP)

(73) Assignee: Daicel Corporation, Osaka-Shi (JP)

( * ) Notice: Subject to any disclaimer, the term of this patent is extended or adjusted under 35 U.S.C. 154(b) by 0 days.

(21) Appl. No.: 13/395,731

(22) PCT Filed: Jan. 21, 2011

(86) PCT No.: PCT/JP2011/051058
§ 371 (c)(1),
(2), (4) Date: Mar. 13, 2012

(87) PCT Pub. No.: WO2011/093216
PCT Pub. Date: Aug. 4, 2011

(65) Prior Publication Data
US 2012/0172585 A1    Jul. 5, 2012

(30) Foreign Application Priority Data

Jan. 29, 2010 (JP) ................................. 2010-019591

(51) Int. Cl.
| | | |
|---|---|---|
| C08B 3/06 | (2006.01) | |
| A61K 31/717 | (2006.01) | |
| C08J 5/18 | (2006.01) | |
| G02B 5/30 | (2006.01) | |
| C08B 15/02 | (2006.01) | |
| C08L 1/12 | (2006.01) | |

(52) U.S. Cl.
CPC ... C08B 3/06 (2013.01); C08J 5/18 (2013.01); G02B 5/3083 (2013.01); C08B 15/02 (2013.01); C08J 2301/12 (2013.01); C08L 1/12 (2013.01)
USPC .................. 536/69; 536/56; 514/57

(58) Field of Classification Search
CPC .............. C08B 3/06; C08B 15/02; C08J 5/18; C08J 2301/12; G02B 5/3083; C08L 1/12; C08L 2666/26
USPC ......................... 536/69, 56; 514/57
See application file for complete search history.

(56) References Cited

U.S. PATENT DOCUMENTS

| | | |
|---|---|---|
| 2004/0059106 A1 | 3/2004 | Yamada et al. |
| 2009/0171079 A1 | 7/2009 | Higuchi |

FOREIGN PATENT DOCUMENTS

| | | |
|---|---|---|
| EP | 1 375 521 A1 | 1/2004 |
| EP | 2 075 261 A1 | 7/2009 |
| JP | 2000-137116 A | 6/2000 |
| JP | 2002-082430 A | 2/2002 |
| JP | 2002-212388 A | 7/2002 |
| JP | 2004-170760 A | 6/2004 |
| JP | 2004-323746 A | 11/2004 |
| JP | 2004-339348 A | 12/2004 |
| JP | 2006-040999 A | 2/2005 |
| JP | 2006-181683 A | 7/2005 |
| JP | 2009-155555 A | 7/2009 |
| JP | 2009155555 A * | 7/2009 |

OTHER PUBLICATIONS

Higuchi, Akihiro; JP 2009155555 A; Jul. 16, 2009 (English Machine Translation).*
International Search Report for PCT/JP2011/051058 dated Apr. 12, 2011.
Uda et al., "Wood Chemistry", pp. 180-190, (1968), Kyoritsu Shuppan Co., Ltd.
Wadano, "Acetate Fiber", pp. 52-53, May 5, 1953, Maruzen Co., Ltd.

* cited by examiner

*Primary Examiner* — Shaojia Anna Jiang
*Assistant Examiner* — Michael C Henry
(74) *Attorney, Agent, or Firm* — Birch, Stewart, Kolasch & Birch, LLP

(57) ABSTRACT

To provide a cellulose acetate which gives a cellulose acetate optical film exhibiting optical properties as a result of stretching, in which the film shows excellent stretchability and gives a stretched film having excellent optical properties.

Disclosed is a cellulose diacetate for a retardation film, having a total degree of acetyl substitution of from 2.27 to 2.56, in which the cellulose diacetate has a polydispersity Mw/Mn of more than 3.0 and 7.5 or less, a degree of substitution at the 6-position of from 0.65 to 0.85, a half height width of acetylation distribution of from 1.0 to 2.3, and a viscosity-average degree of polymerization of 182 or more and 213 or less. The cellulose diacetate for a retardation film preferably has a 6-percent viscosity of from 120 to 230 mPa·s and preferably has a weight-average molecular weight Mw of 205,000 or more and 235,000 or less.

4 Claims, No Drawings

CELLULOSE DIACETATE FOR RETARDATION FILM

TECHNICAL FIELD

The present invention relates to a cellulose diacetate which is used in cellulose ester films for optical films, particularly for retardation films. The resulting films have excellent optical properties, have easily controllable retardation parameters typified by a thickness-direction retardation ($R_{th}$), and show uniform retardation properties.

BACKGROUND ART

Slim, lightweight notebook computers (laptops) have been recently developed more and more. With this, there have been increasing demands on further slimmed and further sophisticated protective films for polarizers (polarizer-protecting films) used in display devices such as liquid crystal display devices. Liquid crystal display devices display an image (information) through the control of polarization by a liquid crystal and thereby require polarizers. Stretched films of a poly(vinyl alcohol) (PVA) containing iodine are generally used as the polarizers. The polarizers are fragile, and, for protecting them, polarizer-protecting films are used. In general, triacetylcellulose films have been widely employed as the polarizer-protecting films. Independently from such polarizer-protecting films, retardation films are used in such optical devices for controlling the phase difference (retardation) of polarized light. Retardation films adopted typically to the liquid crystal display devices are used in combination with polarizers to solve problems such as color compensation and viewing angle extension by the use of thickness-direction retardation $R_{th}$. Some of them have the function of converting linearly polarized light to circularly polarized light or, vice vista, converting circularly polarized light to linearly polarized light using an in-plane retardation $R_e$, at all wavelengths in the visible light range.

Such polarizer-protecting films are provided in order to protecting polarizers, and cellulose acetate films are most desirably used as the polarizer-protecting films in consideration of production process of the polarizers, because the polarizers to be protected are composed of a PVA containing moisture. In contrast, materials other than cellulose acetates have been used for retardation films, so as to exhibit optical properties. Specifically, exemplary materials for retardation films customarily used include polycarbonates, polysulfones, poly(ether sulfone)s, and amorphous polyolefins. The films made from these polymers characteristically have a retardation decreasing with an increasing wavelength of light and thereby exhibit ideal retardation properties at all wavelengths in the visible light range.

To convert linearly polarized light to circularly polarized light or, vice versa, to convert circularly polarized light to linearly polarized light by the action of one retardation film in the visible light range, the retardation film preferably show a retardation of one fourth the wavelength ($\lambda/4$) at an incident wavelength ($\lambda$) of the retardation film. A retardation film of this type can give a reflective display device with excellent image quality by using the retardation film having a retardation of $\lambda/4$ (quarter wave plate) in combination with only one polarizer in a reflective liquid crystal display device having a back electrode serving also as a reflecting electrode. This retardation film is also used as a backside layer of a guest-host liquid crystal layer with respect to a viewer and used as an element for converting circularly polarized light to linearly polarized light in a reflective polarizer which is composed typically of a cholesteric liquid crystal reflecting only one of left-handed and right-handed circularly polarized lights.

The customary retardation films (made typically of polycarbonate (PC), polysulfone (PSu), or PA) have a retardation property of a decreasing in-plane retardation ($R_e$) with an increasing wavelength and are difficult to exhibit ideal retardation properties at all wavelengths in the visible light range. When used in a wide wavelength band, two or more different retardation films are laminated to obtain required performance. To obtain such performance by one retardation film, the retardation film preferably shows an in-plane retardation $R_e$ of $\lambda/4$ at an incident light wavelength entering the retardation film. For this configuration, the retardation film should have a retardation property of an increasing in-plane retardation $R_e$ with an increasing wavelength, contrarily to the above-mentioned retardation property. A cellulose acetate film, if having the retardation property just mentioned above, is useful, because the film can serve both as a polarizer-protecting film and a retardation film, and this eliminates the need for a composite retardation film including two or more different retardation films and allows the optical film (retardation film) to have an improved total light transmission in a liquid crystal display device.

As a possible solution to this problem, Patent Literature (PTL) 1 proposes a technique of using, as a retardation film, an oriented film of a cellulose acetate having a total degree of substitution (degree of acetylation) of from 2.5 to 2.8. The patent literature mentions that, the retardation film according to this technique shows an increasing retardation with an increasing wavelength and exhibits ideal retardation properties at all wavelengths in the visible light range. Specifically, the technique disclosed in PTL 1 provides a retarder (retardation film) which is composed of one retardation film and shows a decreasing retardation with a decreasing wavelength to be measured. An object of this technique is to provide a retarder (retardation plate) which is composed of a polymer oriented film having an increasing birefringence $\Delta n$ with an increasing wavelength in the range of from 400 to 700 nm, in which the polymer oriented film has an increasing average refractive index with a decreasing wavelength in the wavelength range. As a solution, PTL 1 discloses a technique of stretching and thereby orienting a film of cellulose acetate having a degree of acetylation of from 2.5 to 2.8.

PTL 1 discloses in a working example that a cellulose acetate having a degree of acetylation of 2.661 was prepared in the following manner. Specifically, the cellulose acetate was obtained by dissolving 100 parts by weight of a cellulose triacetate being available from Wako Pure Chemical Industries, Ltd. and having a limiting viscosity [η] of 1.335 and a degree of acetylation of 2.917 in 500 parts by weight of methylene chloride; adding thereto 1000 parts by weight of a 96% aqueous solution of acetic acid; hydrolyzing the cellulose triacetate with acetic acid and water at 70° C. for 100 minutes while removing methylene chloride under reduced pressure; precipitating and washing the reaction product with large excess of water; and drying the washed precipitates. PTL 1 further discloses that 100 parts by weight of the resulting polymer and 3 parts by weight of dibutyl phthalate as a plasticizer were dissolved in 700 parts by weight of a 9:1 (by weight) solvent mixture of methylene chloride and methanol to give a solution, the solution was cast into a film by solution casting, and the film was further uniaxially stretched at a temperature of 170° C. to a draw ratio of 1.5 times. Specifically, PTL 1 mentions in Example 1 that a retardation film having such wavelength characteristics (wavelength dispersion characteristics) as to have an increasing retardation with an increasing wavelength was obtained by stretching. This literature further discloses that the resulting retardation film can also serve as a quarter wave (λ/4) retardation film or another retardation film by regulating its in-plane retardation $R_e$. In addition, PTL 1 discloses a cellulose acetate having a degree of acetylation of 2.421 in Example 4. However, when a film was prepared using this cellulose acetate, and retardation properties of the film were measured, the film showed an insufficient in-plane retardation $R_e$ at a film thickness of around 100 μm (from 50 to 150 μm) which thickness is suitable as a freestanding film. Independently, when having a large thickness of around 200 μm, the film showed a suitable in-plane retardation $R_e$ of about 80 to 150 nm but an excessively large thickness-direction retardation $R_{th}$ of more than 350 nm; indicating that the film, when working as a quarter wave (λ/4) retardation film, does not sufficiently work as a viewing angle extension film. In addition, PTL 1 does not describe the molecular weight distribution of the resulting cellulose acetate and neither describes nor indicates the control of retardation properties by controlling the molecular weight distribution.

PTL 2 discloses a cellulose ester film including a cellulose ester which contains an acyl group having 2 to 4 carbon atoms as a substituent, has a total degree of acyl substitution of less than 2.67 at the 2-, 3-, and 6-positions in a glucose residue, and has a degree of acyl substitution of less than 0.87 at the 6-position (Abstract). This technique has been made in order to provide a cellulose ester film, a long-length retardation film, an optical film, and a method for producing the same, in which the cellulose ester film can give, with good productivity, an optical film having a uniform retardation function, showing excellent plane quality (with less pressed concave defects and less thickness deviation), having an easily controllable retardation parameter R0, and showing uniform retardation properties; and to provide a polarizer and a display device each using them and having excellent display quality. PTL 2 describes that the cellulose acetate may be obtained in the following manner. To 100 parts by mass of a cellulose were added 16 parts by mass of sulfuric acid, 260 parts by mass of acetic anhydride, and 420 parts by mass of acetic acid; the mixture was raised in temperature from room temperature to 60° C. over 60 minutes with stirring and subjected to an acetylation reaction for 15 minutes while maintaining the temperature at 60° C.; a solution of magnesium acetate in a mixture of acetic acid and water was then added thereto to neutralize sulfuric acid; water vapor was introduced into the reaction system; the temperature was held at 60° C. for 120 minutes to perform saponification/aging; the resulting substance was then washed with a large amount of water until acetic acid odor was not detected, followed by drying, and thereby yielded a cellulose acetate 1 having a degree of acetyl substitution of 2.65 and a viscosity-average degree of polymerization of 290. PTL 2 discloses that the obtained cellulose acetate 1 had a degree of acetyl substitution at the 6-position of 0.85 as determined by $^{13}$C-NMR and that the resulting cellulose acetates obtained in the working examples each had a ratio Mn/Mw (this ratio is probably Mw/Mn) between the number-average molecular weight (Mn) and the weight-average molecular weight (Mw) of from 2.0 (Example 1) to 3.0 (Example 2).

PTL 3 discloses a method for producing a cellulose ester film, which method includes the steps of casting a dope onto a belt support according to a solution casting filming process to form a web; beginning stretching of the web in a machine direction (MD) at the time when the amount of residual solvent in the web is 40 percent by mass or more; and stretching the web in a transverse direction (TD) at the time when the amount of residual solvent in the web becomes less than 40 percent by mass, in which the dope contains an ultraviolet absorber, two or more plasticizers, and a cellulose ester, one of the plasticizers is a polyhydric alcohol ester plasticizer, at least one of the other plasticizer(s) is a plasticizer selected from plasticizers other than phosphoric ester plasticizers, and the cellulose ester has a weight-average molecular weight Mw and a number-average molecular weight Mn with a ratio Mw/Mn of 1.8 to 3.0. This technique has been developed to provide a cellulose ester film, a production method of the cellulose ester film, and a polarizer using the cellulose ester film, which cellulose ester film excels in optical properties, dimensional stability, transparency, flatness, and resistance to frame-like white patches.

PTL 4 discloses the use of a cellulose acylate which has a degree of acyl substitution at the 2-position and the 3-position in total of 1.70 or more and 1.90 or less and has a degree of acyl substitution at the 6-position of from 0.88 or more, namely, has a total degree of substitution of from 2.58 to 2.78, in order to obtain a cellulose acylate solution showing excellent stability with time and having a low viscosity at dope concentrations within a practically usable range. PTL 4 also discloses, in Example 1, a cellulose acetate having a degree of substitution at the 2- and 3-positions of 1.88 and a degree of substitution at the 6-position of 0.89, namely, having a total degree of substitution of 2.77.

A technique disclosed in PTL 5 has been made to provide an optical film, a production method thereof, and a polarizing film using the same, which optical film is useful as a protective film for a polarizing film for use in liquid crystal display devices and is composed of a cellulose ester film, in which the optical film has a high modulus of elasticity both in machine and transverse directions, whereby suppresses the shrinkage of the polarizing film, and preventing the polarizing film from peeling off from a liquid crystal cell due to the shrinkage of the polarizing film. PTL 5 describes that an optical film composed of a cellulose ester film is produced through a solution casting filming process. Specifically, PTL 5 discloses a technique including the steps of preparing a solution of a cellulose ester having a molecular weight distribution (Mw/Mn) as a ratio of the weight-average molecular weight (Mw) to the number-average molecular weight (Mn) of 1.4 to 3.0; casting the cellulose ester solution onto a support to form a web; separating the film (web) from the support; and, while drying the film, stretching the film to a draw ratio of 1.1 to 1.5 times simultaneously both in a film transporting direction (machine direction (MD)) and in a direction (transverse direction (TD)) being in the film plane and being perpendicular to the film transporting direction during when the amount of residual solvent in the film be from 10% to 100%.

A technique disclosed in PTL 6 has been made to provide a cellulose ester film which is suitable as a polarizer-protective film in a liquid crystal display device (LCD), has a satisfactory distribution of orientation angle in a transverse direction of the cellulose ester film, does not suffer from so-called banding defects (banding thickness variation) upon separation from the support, has high quality, is peelable stably, is very advantageous in cost, and is inexpensive. PTL 6 describes that, of cellulose ester films each produced by a solution casting filming process and composed of two or more different cellulose esters, preferred is a cellulose ester film containing a cellulose ester derived from wood pulp and having a molecular weight distribution Mw/Mn of from 1.8 to 3.0, in which the content of this cellulose ester is 50 percent by weight or more based on the total weight of cellulose esters constituting the film. PTL 6 describes that the ratio of a wood pulp-derived cellulose triacetate to a cotton linter-derived cellulose triacetate in cellulose triacetates was set to be 100/0 in Examples 1 and 4, to be 80/20 in Examples 2, 5, and 7, and to be 50/50 in Examples 3 and 6; and that the molecular weight distribution (Mw/Mn) of the wood pulp-derived cellulose triacetate was set to be 1.8 in Examples 1 to 3, to be 3.0 in Examples 4 to 6, and to be 2.3 in Example 7, whereas the molecular weight distribution (Mw/Mn) of the cotton linter-derived cellulose triacetate was set to be constant, i.e., 3.5 in all the examples.

PTL 7 discloses a cellulose ester film having a molecular weight distribution (Mw/Mn) of from 1.0 to 5.0 (claim 5) and describes that the cellulose ester preferably substantially a cellulose triacetate (Paragraph 0056). PTL 7 discloses films each containing a cellulose triacetate and having a molecular weight distribution (Mw/Mn) of 3.5 in Examples 6 and 9, but fails to investigate or specify other parameters such as thickness-direction retardation $R_{th}$.

PTL 8 discloses a retardation film and a production method thereof, which retardation film shows less variation in retardation properties even when it has a small thickness and is used for a long time or used in a varying environment. PTL 8 also discloses a retardation film which shows a wide viewing angle when used in a liquid crystal image display device and which shows a satisfactory viewing angle even when used over a long term. Specifically, the retardation film disclosed in PTL 8 has an in-plane retardation Ro of from 30 to 200 nm and a thickness-direction retardation Rt of from 70 to 400 nm, which film is formed from a cellulose ester having a total degree of acyl substitution of from 2.40 to 2.80 and an unsubstitution degree of hydroxyl groups at the 6-position of from 0.15 to 0.42. However, PTL 8 does not consider the molecular weight distribution Mw/Mn of the cellulose ester and merely provides retardation films each having a thickness-direction retardation Rt of at most 155 nm or less in the working examples.

PTL 9 discloses the production of a 6-position highly acetylated cellulose diacetate which is useful typically as a material for cellulose acylates of different acyl groups, which cellulose acylates have a high total degree of acyl substitution and are usable typically as materials typically for photographic materials and optical materials. This literature discloses a 6-position highly acetylated cellulose diacetate which is a cellulose diacetate having a 6-percent viscosity of 40 to 600 mPa·s and having a total degree of acetyl substitution of DSt and a degree of acetyl substitution at the 6-position of DS6, in which DSt and DS6 satisfy following Relational Expressions (1) and (2): $2.0 \leq DSt < 2.6$; $0.400 \geq (DS6/DSt) \geq 0.531 - 0.088 \times DSt$. An object of the technique disclosed in this literature is to provide a cellulose diacetate which is highly acetylated at the 6-position, has a not-so-high total degree of acetyl substitution so as to have a certain margin of introducing other acyl groups than acetyl group, and has a relatively high molecular weight. The literature also discloses a process for producing such a cellulose acetate, which process includes the steps of reacting a cellulose with an acetylating agent in a solvent in the presence of a catalyst to give a cellulose triacetate having a total degree of acetyl substitution of 2.6 or more; and hydrolyzing the cellulose triacetate in acetic acid in the presence of an acetylation catalyst in an amount of from 0.56 to 8.44 parts by weight per 100 parts by weight of the cellulose triacetate and in the presence of water in an amount of 22 percent by mole or more and less than 50 percent by mole relative to the amount of the acetic acid at a temperature of from 40° C. to 90° C., to give a cellulose diacetate being highly acetylated at the 6-position. The literature describes that the 6-position highly acetylated cellulose diacetate is preferably a cellulose diacetate having a uniformly distributed total degree of acetyl substitution; that the uniformity of the total degree of acetyl substitution may be determined based on, as an index, the magnification of half height width of a maximum peak in an intermolecular substitution distribution curve or in an intermolecular acetylation distribution curve of the cellulose diacetate; and that the half height width of a maximum peak in an intermolecular substitution distribution curve of the cellulose diacetate is preferably 0.150 or less, more preferably 0.140 or less, and particularly preferably 0.130 or less.

An object of the technique disclosed in Citation 9 is to provide a cellulose acetate material which has a not-so-high total degree of acetyl substitution so as to have a certain margin of introducing other acyl groups than acetyl group, because, when a substituent having carbon atoms in a larger number than that of acetyl group is introduced into an original cellulose acetate, the resulting cellulose acetate can have higher stretchability. Citation 9, however, fails to disclose the ratio (Mw/Mn) of the weight-average molecular weight Mw to the number-average molecular weight Mn, and neither describes nor indicates the optimization of the ratio (Mw/Mn) of the weight-average molecular weight Mw to the number-average molecular weight Mn to obtain high stretchability.

Fundamental principles of processes for preparing cellulose acetates are described in Non-Patent Literature (NPL) 1. A representative preparation process is a liquid phase acetylation process using acetic anhydride (as an acetyl group donor), acetic acid (as a solvent), and sulfuric acid (as a catalyst). Specifically, a material cellulose such as wood pulp is pretreated (activated) with an adequate amount of acetic acid, and the pretreated material is added to a previously cooled acetylation mixture to convert into an acetic acid ester to thereby give a cellulose acetate. The acetylation mixture generally contains acetic acid as a solvent, acetic anhydride as an acetyl group donor (esterifying agent), and sulfuric acid as a catalyst. The acetic anhydride is generally used in a stoichiometrically excess amount to the total amount of the cellulose as a reactant and water in the system. After the completion of the acetylation reaction, an aqueous solution of a neutralizer is added for the hydrolysis of excess acetic anhydride remained in the system and for the neutralization of part of the esterification catalyst. Exemplary neutralizers herein include carbonates, acetates, and oxides of sodium, potassium, calcium, magnesium, iron, aluminum, zinc, and ammonium. According to known processes, the prepared cellulose acetate is ripened (aged) by maintaining the same at a temperature of from 50° C. to 90° C. in the presence of a small amount of an acetylation catalyst (generally, the residual sulfuric acid) to convert into a cellulose acetate having a desired degree of acetyl substitution and a desired degree of polymerization. At the time when such a desired cellulose acetate is obtained, the residual catalyst in the system is fully neutralized with a neutralizer as mentioned above, or, without neutralizing the residual catalyst, the cellulose acetate solution is poured into water or diluted acetic acid, or water or diluted acetic acid is poured into the cellulose acetate solution, to separate the cellulose acetate, and the separated cellulose acetate is washed and stabilized to thereby give a product cellulose acetate.

In the activation step (or pretreatment step), a cellulose is activated by treating with an acetylation solvent (solvent used in the acetylation step). Acetic acid is generally used as the acetylation solvent, but exemplary acetylation solvents usable herein further include other solvents than acetic acid, such as methylene chloride; and a solvent mixture of acetic acid with another solvent than acetic acid, such as methylene chloride. The material cellulose is generally supplied in the form of a sheet, and the sheet-like material cellulose is broken into pieces in dry manner and then subjected to the activation treatment (or pretreatment). A strong acid such as sulfuric acid may be added to the acetylation solvent for use in the activation step. However, treatment with an acetylation solvent containing a large amount of a strong acid may accelerate the depolymerization of the cellulose and may cause the cellulose to have a lower degree of polymerization. Typically, the amount of a strong acid (sulfuric acid) added in the pretreatment step according to a common technique is about 0.1 to 0.5 part by weight per 100 parts by weight of the material cellulose. It has been revealed that the use of a strong acid (sulfuric acid) in an amount of 0.5 part by weight or more per 100 parts by weight of the material cellulose in the pretreatment step causes the cellulose to have a low molecular weight (NPL 2). According to the known technique, the activation step is performed for a time (treatment time) of typically from 10 to 180 minutes, and preferably from 20 to 120 minutes.

According to the known technique, an acetylation reaction in the acetylation step may be performed for a time (total acetylation time) of typically from 20 minutes to 36 hours, and preferably from 30 minutes to 20 hours, while the acetylation time may vary depending typically on the reaction temperature. The acetylation is particularly preferably carried out at least at temperatures of from 30° C. to 50° C. for about 30 minutes to 180 minutes, and preferably about 50 minutes to 150 minutes. Additionally, in the known technique, the time of terminating the acetylation reaction is not recognized as significantly affecting the properties of the resulting cellulose acetate and is often determined for reasons of the process, typified by limitation by the amount of the neutralizer fed through a feed piping.

In the synthesis of a cellulose acetate, an acetylation reaction of cellulose and a cleaving reaction (depolymerization) of β-glucosidic bonds constituting the molecular frame of the cellulose simultaneously proceed in parallel with each other. The depolymerization reaction of cellulose can be considered as a random reaction and follows a most probable distribution. Accordingly, when the depolymerization proceeds to some extent in the synthesis of a cellulose acetate, the molecular weight distribution of the cellulose acetate approaches 2, as is the case with a random polymer having a sufficiently increased molecular weight which has a molecular weight distribution of 2. As is demonstrated above, the esterification and hydrolysis of a cellulose acetate should be performed in the shortest possible time to allow the cellulose acetate to maintain a large molecular weight distribution when the cellulose acetate is a cellulose diacetate.

In contrast, when a cellulose acetate has a uniform chemical composition in the synthesis thereof, it means that the material cellulose is sufficiently reacted both in the cellulose esterification step and in the hydrolysis step of the resulting cellulose ester to allow the cellulose acetate to have a uniform chemical composition. Accordingly, the esterification and hydrolysis of a cellulose acetate should be performed for a sufficiently long time in order to allow the cellulose acetate to have a uniform chemical composition. Thus, a uniform chemical composition and a ununiform molecular weight distribution are incompatible requirements with each other in the cellulose acetate synthesis, and compatibility between these properties has not yet been achieved.

CITATION LIST

Patent Literature

PTL 1: Japanese Unexamined Patent Application Publication (JP-A) No. 2000-137116
PTL 2: JP-A No. 2002-062430
PTL 3: JP-A No. 2005-040999
PTL 4: JP-A No. 2002-212338
PTL 5: JP-A No. 2005-181683
PTL 6: JP-A No. 2004-339348
PTL 7: JP-A No. 2004-323746
PTL 8: JP-A No. 2004-170760
PTL 9: JP-A No. 2009-155555

Non Patent Literature

NPL 1: Uda et al. "Wood Chemistry", pages 180-190 (1968), Kyoritsu Shuppan Co., Ltd.
NPL 2: Motoi WADANO, "Acetate Fiber", May 5, 1953, Maruzen Co., Ltd.

SUMMARY OF INVENTION

Technical Problem

An object of the present invention is to provide a cellulose diacetate for a retardation film, which retardation film is satisfactorily stretchable for the regulation of retardation, has excellent filterability for giving an optical film, has a small content of cellulose esters each having a low degree of substitution and causing, for example, bright-spot foreign particles, has a relatively high thickness-direction retardation $R_{th}$ even being unstretched, and effectively exhibits retardation after being stretched.

Solution to Problem

After intensive investigations, the present inventors have found that, when a cellulose diacetate having a total degree of substitution (average degree of substitution) of from 2.27 to 2.56 is synthesized so as to have a uniform chemical composition but to have a high polydispersity in molecular weight (broad molecular weight distribution), the resulting cellulose diacetate can have both more satisfactory stretchability and more satisfactory filterability. The present invention has been made based on these findings.

As is described above, the uniformity of molecular weight distribution of the cellulose diacetate is effective for improving the stretchability. The present inventors have found that the reduction of unreacted components and lowly acetylated components in the cellulose diacetate also improves the stretchability. This is probably because unreacted components and lowly acetylated components in the cellulose diacetate have not been completely removed even through the filtration step performed in the filming process of the cellulose ester, and at least part thereof remain; and the reduction or elimination of such unreacted components and lowly acetylated components in the synthesis of the cellulose diacetate may improve the stretchability.

Specifically, the present invention provides a cellulose diacetate for a retardation film, the cellulose diacetate is a cellulose diacetate having a total degree of acetyl substitution of 2.27 to 2.56, in which the cellulose diacetate has a polydispersity Mw/Mn of more than 3.0 and 7.5 or less, a degree of substitution at the 6-position of from 0.65 to 0.85, a half height width of acetylation distribution of from 1.0 to 2.3, and a viscosity-average degree of polymerization of 182 or more and 213 or less.

The cellulose diacetate for a retardation film according to the present invention preferably has a 6-percent viscosity of from 120 to 230 mPa·s and preferably has a weight-average molecular weight Mw of 205,000 or more and 235,000 or less.

Advantageous Effects of Invention

The cellulose diacetate for a retardation film according to the present invention simultaneously exhibits satisfactory stretchability, develops satisfactory retardation when being stretched, shows good filterability, and less suffers from optical foreign particles such as bright-spot foreign particles contained therein. The cellulose acetate according to the present invention satisfy both incompatible requirements upon its synthesis, namely, the synthesized cellulose acetate has a uniform chemical composition and a uniform molecular weight distribution.

DESCRIPTION OF EMBODIMENTS

The cellulose diacetate for a retardation film according to the present invention is a cellulose diacetate having a total degree of acetyl substitution of from 2.27 to 2.56, in which the cellulose diacetate has a polydispersity Mw/Mn of more than 3.0 and 7.5 or less, has a degree of substitution at the 6-position of from 0.65 to 0.85, has a half height width of acetylation distribution of from 1.0 to 2.3, and has a viscosity-average degree of polymerization of 182 or more and 213 or less. The cellulose diacetate preferably has a 6-percent viscosity of from 120 to 230 mPa·s and preferably has a weight-average molecular weight Mw of 205,000 or more and 235,000 or less.

(Total Degree of Substitution)

A cellulose diacetate for a retardation film according to the present invention has a total degree of acetyl substitution (average degree of substitution) of from 2.27 to 2.56, namely, has a degree of acetylation of from 52.9 to 57.0. The cellulose diacetate for a retardation film provided according to the present invention can give a retardation film having a thickness-direction retardation $R_{th}$ of typically from 200 to 400 nm. A cellulose diacetate having a total degree of substitution of less than 2.27, i.e., having a degree of acetylation of less than 52.9, gives a retardation film having an excessively high in-plane retardation ($R_e$). A cellulose diacetate having a total degree of substitution of more than 2.56, i.e., having a degree of acetylation of more than 57.0, may give a retardation film having a not-so-sufficiently-high thickness-direction retardation ($R_{th}$).

A most regular way to determine the average degree of substitution of a cellulose acetate is the method for measuring a degree of acetylation prescribed in American Society for Testing and Materials' Standard ASTM-D-817-91 (Test Methods of Testing Cellulose Acetate etc.). The degree of acetylation (amount of binding acetic acid) determined according to ASTM may be converted to a degree of substitution according to following Expression (1):

$$DS=162 \times AV \times 0.01/(60-42 \times AV \times 0.01) \qquad (1)$$

In Expression (1), DS represents the total degree of acetyl substitution; and AV represents the degree of acetylation (%). The converted degree of substitution ranges from 52.9 to 57.0 at the total degree of substitution (average degree of substitution) of from 2.27 to 2.56. The converted degree of substitution may generally have a some error with respect to the value measured by NMR.

(Polydispersity Mw/Mn)

The cellulose diacetate for a retardation film according to the present invention has a polydispersity of more than 3.0 and 7.5 or less. The polydispersity herein is a molecular weight distribution Mw/Mn obtained by dividing the weight-average molecular weight Mw by the number-average molecular weight Mn. A cellulose diacetate having a polydispersity Mw/Mn of 3.0 or less may have a physically excessively uniform molecular size and may thereby have a low rupture elongation (fracture elongation). A cellulose diacetate having a polydispersity Mw/Mn of more than 7.5 may include large amounts of unreacted components and may thereby have a low rupture elongation. The cellulose diacetate has a polydispersity Mw/Mn of preferably from 4.0 to 7.5 and particularly preferably from 4.5 to 7.3. The cellulose diacetate for a retardation film according to the present invention may be a mixture of two or more different cellulose diacetates having different average molecular weights and different polydispersities. In this case, it is enough that the mixture has average molecular weights and a polydispersity within the above ranges.

The cellulose diacetate for a retardation film according to the present invention has a weight-average molecular weight Mw of preferably 205,000 or more and 235,000 or less and more preferably from 210,000 to 233,000. The cellulose diacetate, if having a weight-average molecular weight Mw of less than 205,000, may often have a low viscosity and tend to have a low rupture elongation (fracture elongation). The cellulose diacetate, if having a weight-average molecular weight Mw of more than 235,000, may tend to show insufficient filterability.

The number-average molecular weight (Mn), weight-average molecular weight (Mw), and polydispersity (Mw/Mn) of the cellulose ester may be determined according to known methods using high-performance liquid chromatography.

(Degree of Substitution at 6-Position)

The cellulose diacetate for a retardation film according to the present invention has a degree of substitution at the 6-position of from 0.65 to 0.85. A cellulose diacetate having a degree of substitution at the 6-position of less than 0.65 undergoes an excessively uniform reaction, thus shows poor filterability, and gives a film having a low rupture elongation. A cellulose diacetate having a degree of substitution at the 6-position of more than 0.85 shows a low rupture elongation due to reduction in hydrogen bonding derived from 6-position hydroxyl groups. The cellulose diacetate has a degree of substitution at the 6-position of preferably from 0.68 to 0.85 and particularly preferably from 0.70 to 0.85.

The respective degrees of acetyl substitution at the 2-, 3-, and 6-positions in the glucose ring of the cellulose diacetate can be measured by nuclear magnetic resonance spectrometry (NMR) according to the method described by Tezuka (Tezuka, Carbohydr. Res. 273, 83 (1995)). Specifically, free hydroxyl groups of a cellulose diacetate sample are propionylated with propionic anhydride in pyridine, the resulting sample is dissolved in deuterated chloroform and subjected to $^{13}$C-NMR spectral measurement. Carbon signals of acetyl group appear in the order from the 2-position, via 3-position, to 6-position from a higher magnetic field in a region of from 169 ppm to 171 ppm, and carbonyl carbon signals of propionyl group appear in the same order in a region of from 172 ppm to 174 ppm. The respective degrees of acetyl substitution at the 2-, 3-, and 6-positions in the glucose ring of the original cellulose diacetate can be determined based on abundance ratios between acetyl group and propionyl group at the corresponding positions, respectively. Instead of $^{13}$C-NMR, the degrees of acetyl substitution can also be determined by $^1$H-NMR.

(Half Height Width of Acetylation Distribution)

The cellulose diacetate for a retardation film according to the present invention has a half height width of acetylation distribution of from 1.0 to 2.3. A cellulose diacetate having a half height width of acetylation distribution of less than 1.0 and a cellulose diacetate having a half height width of acetylation distribution of 2.3 show low rupture elongations. The cellulose diacetate has a half height width of acetylation distribution of preferably from 1.5 to 2.3 and particularly preferably from 1.9 to 2.3.

In a preferred embodiment of the present invention, the cellulose diacetate is a cellulose diacetate having a uniformly distributed total degree of acetyl substitution. The uniformity of the total degree of acetyl substitution may be determined based on, as an index, the magnification of half height width of a maximum peak in an intermolecular substitution distribution curve or in an intermolecular acetylation distribution curve of a cellulose diacetate. As used herein the term "half height width" refers to a width of a chart at a height half the peak height in the chart, in which the chart is plotted with the abscissa (X-axis) indicating a degree of substitution (degree of acetylation) and the ordinate (Y-axis) indicating an abundance at the degree of substitution. The half height width is an index indicating how the distribution disperses.

The half height width of substitution distribution may be determined through high-performance liquid chromatography (HPLC). Specifically, the half height width of compositional distribution of the cellulose diacetate according to the present invention can be determined in the following manner. Two or more cellulose acetates (hereinafter also referred to as "cellulose esters") having different degrees of substitution as standard referential materials are subjected to HPLC using a predetermined measuring instrument under predetermined measuring conditions; and a calibration curve is plotted based on the resulting data of the standard referential materials. The calibration curve is a curve indicating how the abundance of a cellulose ester varies depending on the degree of substitution (degree of acetylation), and is generally a quadric curve, and is preferably a parabola. Based on the plotted calibration curve, the half height width of compositional distribution of the target cellulose ester is determined.

More specifically, the half height width of substitution distribution may be determined by plotting an elusion curve of the sample cellulose ester (cellulose diacetate) measured under predetermined process conditions through HPLC (reverse-phase HPLC), and converting the abscissa (elution time) in the elusion curve into a degree of substitution (from 0 to 3).

The elution time may be converted into a degree of substitution typically by a method described in JP-A No. 2003-201301 (Paragraphs [0037] to [0040]). By way of example, when an elusion curve is converted into a substitution distribution (intermolecular substitution distribution) curve, it is accepted that elution times of two or more (e.g., four or more) samples having different degrees of substitution are measured under the same measuring conditions, and a conversion formula (transformation) is plotted, according to which a degree of substitution (DS) is determined from an elution time (T). Specifically, the function of calibration curve is determined through the least squares method based on the relationship between the elution time (T) and the degree of substitution (DS). The function is generally given in following quadratic expression (2):

$$DS = aT^2 + bT + c \quad (2)$$

wherein DS represents the degree of ester substitution; T represents the elution time; and "a", "b", and "c" are coefficients of the transformation.

The resulting substitution distribution curve determined according to the transformation is a distribution curve of the degree of substitution of the cellulose ester, with the ordinate indicating an abundance of the cellulose ester and the abscissa indicating a degree of substitution of the cellulose ester. Based on the substitution distribution curve, the half height width of substitution distribution with respect to an observed maximum peak (E) corresponding to an average degree of substitution is determined in the following manner. Specifically, a base line (A-B) tangent is drawn from the base point (A) at the lower degree of substitution to the base point (B) at the higher degree of substitution of the maximum peak (E). Independently, a line perpendicular to the abscissa is drawn from the maximum peak (E) of the curve to determine the intersection (C) between the perpendicular line and the base line (A-B). The midpoint (D) between the peak (E) and the intersection (C) is then determined. A line including the midpoint (D) is drawn parallel to the base line (A-B) to determine two intersections (A', B') of the line and the intermolecular substitution distribution curve. From each of the intersections (A', B'), a line perpendicular to the abscissa is drawn. The interval between the feet of the thus-drawn perpendiculars is defined as the half height width of the maximum peak.

The half height width of substitution distribution reflects that respective cellulose ester molecules contained in a sample show different retention times depending on how hydroxyl groups of respective glucose rings are esterified in respective high-molecular chains constituting the cellulose ester molecules. Therefore, the width of the retention time ideally indicates the width of compositional distribution (in terms of degree of substitution). However, a high-performance liquid chromatograph has ducts, such as a guide column for protecting the measuring column), that do not contribute to the partition (distribution). The width of retention time often includes an error that is caused not by the width of compositional distribution but by such configuration of the measuring instrument. The error is affected typically by the length and inner diameter of the column, and the length and routing from the column to a detector, and varies depending on the configuration of the measuring instrument, as mentioned above.

Thus, the half height width of substitution distribution of the cellulose ester may be determined as a corrected value Z according to a compensation formula. The compensation formula can give a more accurate half height width of substitution distribution as a constant or substantially constant value not depending on the type of the measuring instrument and the measuring conditions. The compensation formula is generally represented by following Expression (3):

$$Z = (X^2 - Y^2)^{1/2} \quad (3)$$

wherein X represents the half height width of substitution distribution (uncorrected value) determined with a predetermined measuring instrument under predetermined measuring conditions; and Y represents the half height width of substitution distribution of a cellulose ester having a total degree of substitution of 3, determined with the same measuring instrument under the same measuring conditions as in X.

As used in the above formula, the term "cellulose ester having a total degree of substitution of 3" refers to a cellulose ester in which all hydroxyl groups of a material cellulose are esterified (e.g., in the case of cellulose acetates, the term refers to a cellulose triacetate having a degree of acetylation of 62.5%), and corresponds to a fully substituted cellulose ester obtained before ripening. It is in fact, or ideally, a cellulose ester having no half height width of substitution distribution, i.e., a cellulose ester having a half height width of substitution distribution of 0.

As has been described above, the intermolecular substitution distribution curve of a cellulose diacetate can be determined by plotting an elusion curve of the cellulose diacetate in reverse-phase HPLC, and converting the abscissa (elution time) of the elusion curve into a total degree of acetyl substitution (from 0 to 3). Likewise, the elusion curve of the cellulose diacetate in reverse-phase HPLC may also give an acetylation distribution curve, which in turn gives a half height width of acetylation distribution in the similar manner as with the half height width of substitution distribution.

(Viscosity-Average Degree of Polymerization)

The cellulose diacetate for a retardation film according to the present invention has a viscosity-average degree of polymerization of 182 or more and 213 or less, preferably from 185 to 210, and more preferably from 187 to 206. A cellulose diacetate having a viscosity-average degree of polymerization of less than 182 has a low rupture elongation. A cellulose diacetate having a viscosity-average degree of polymerization of more than 213 shows insufficient filterability.

The viscosity-average degree of polymerization can be determined by the intrinsic viscosity method of Uda et al. (Kazuo Uda & Hideo Saito: Journal of the Society of Fiber Science and Technology, Japan, Vol. 18, No. 1, pages 105-120 (1962)). In the method, a solvent may be selected according typically to the degree of substitution of the cellulose diacetate. For example, a sample cellulose diacetate is dissolved in a 9:1 (by weight) mixture of methylene chloride and methanol to give a solution of a predetermined concentration "c" (2.00 g/L); the solution is injected into an Ostwald viscometer; and a flow time "t" in seconds of the solution required to pass through between the viscometer graduations at 25° C. is measured. Separately, a flow time "$t_0$" in seconds of the solvent mixture alone is measured by the above procedure; and the viscosity-average degree of polymerization is calculated according to following Expressions (4) to (6):

$$\eta_{rel}=t/t_0 \tag{4}$$

$$[\eta]=(\ln \eta_{rel})/c \tag{5}$$

$$DP=[\eta]/(6\times10^{-4}) \tag{6}$$

wherein "t" represents the flow time in seconds of the solution; "$t_0$" represents the flow time in seconds of the solvent; "c" represents the cellulose diacetate concentration (g/L) of the solution; $\eta_{rel}$ represents the relative viscosity; [η] represents the intrinsic viscosity; and DP represents the average degree of polymerization.

(6-Percent Viscosity)

The cellulose diacetate for a retardation film according to the present invention has a 6-percent viscosity of typically from 120 mPa·s to 230 mPa·s, preferably from 125 mPa·s to 210 mPa·s, more preferably from 130 mPa·s to 200 mPa·s, and particularly preferably from 135 mPa·s to 160 mPa·s. The cellulose diacetate, if having an excessively high 6-percent viscosity, may show insufficient filterability and may fail to have a sufficiently high polydispersity (sufficiently broad molecular weight distribution). The cellulose diacetate, if having an excessively low 6-percent viscosity, may give a film which will be broken upon stretching. The cellulose diacetate may be a mixture prepared by blending two or more different cellulose diacetates having different 6-percent viscosities so that the mixture has a 6-percent viscosity within the above range.

The 6-percent viscosity of the cellulose diacetate may be measured in the following manner.

In an Erlenmeyer flask are placed 3.00 g of a dried sample and 39.90 g of a 95% aqueous acetone solution, and the flask is tightly stopped, followed by stirring for about one and a half hours. Then the sample is completely dissolved by shaking in a rotary shaker for one hour, to give a 6 weight/volume percent solution. The solution is transferred into a predetermined Ostwald viscometer up to the marker line, and the temperature of the solution is regulated at 25±1° C. for about 15 minutes. The flow time required to pass between time-marker lines is measured, and the 6-percent viscosity is calculated according to following Expression (7):

$$6\text{-Percent viscosity(mPa·s)}=(\text{Flow time(s)})\times(\text{Viscometer coefficient}) \tag{7}$$

The viscometer coefficient is determined by measuring the flow time of a standard solution for viscometer calibration [supplied by SHOWA SHELL SEKIYU K.K. under the trade name "JS-200" (in accordance with Japanese Industrial Standards (JIS) Z 8809)] by the above procedure, and calculating the viscometer coefficient according to following Expression (8):

$$\text{Viscometer coefficient}=\{(\text{Absolute viscosity of standard solution(mPa·s)})\times(\text{Density of solution}(0.827 \text{ g/cm}^3))\}/\{(\text{Density of standard solution}(\text{g/cm}^3))\times(\text{Flow time of standard solution(second)})\} \tag{8}$$

(Degree of Filtration Kw)

A degree of filtration (Kw) is an index for the level of filterability of a solution and is represented by the expression: Kw=k×10000, wherein "k" represents a filtration constant. Specifically, the degree of filtration Kw is 10000 times the filtration constant k. The filtration constant k may be determined based on an amount $P_1$ of the filtrate recovered at an elapsed time $t_1$ and an amount $P_2$ of the filtrate recovered at an elapsed time $t_2$ ($\neq t_1$) according to following Expression (9):

$$k=\{2-(P_2/P_1)\}/2(P_1+P_2) \tag{9}$$

The cellulose diacetate for a retardation film according to the present invention preferably has a degree of filtration (Kw) of from 50 to 200. The cellulose diacetate, if having a degree of filtration (Kw) of less than 50, may have an excessively low viscosity and may often have a low rupture elongation, thus being undesirable. The cellulose diacetate, if having a degree of filtration (Kw) of more than 200, may often show insufficient handleability. The cellulose diacetate can have a higher degree of filtration Kw by subjecting a reaction mixture after the reaction to a fractionation process such as centrifugal separation or microfiltration typically with a diatomaceous earth.

(Production of Cellulose Diacetate for Retardation Film)

The cellulose diacetate for a retardation film according to the present invention may be produced typically through (A) an activation step (pretreatment step), (B) an acetylation step, (C) an acetylation-reaction terminating step, (D) a ripening step (hydrolysis step), (E) a ripening-reaction terminating step, and (F) a fractionation step.

[Material Cellulose]

Examples of the material cellulose usable herein include a variety of cellulose sources including wood pulps such as hardwood pulps and softwood pulps; and linter pulps such as cotton linter pulps. These pulps generally contain exotic components such as hemicelluloses. Accordingly, the term "cellulose" as used herein also means and includes a cellulose further containing an exotic component such as a hemicellulose. The wood pulp for use herein can be at least one selected from softwood pulps and hardwood pulps and can be a combination of a softwood pulp and a hardwood pulp. The combination use of a linter pulp (e.g., a purified cotton linter) and a wood pulp is also possible. Celluloses having a high degree of polymerization, such as linter pulps, are usable in the present invention, of which a cotton linter pulp is preferred. The cellulose for use herein is preferably a cellulose at least partially containing a linter pulp. The cellulose may have an α-cellulose content (by weight) of 98% or more, for example from about 98.5% to 100%, preferably from about 99% to 100%, and more preferably from about 99.5% to 100%, as an index of degree of crystallinity. The cellulose may be one containing a certain quantity of carboxyl group binding, for example, to a cellulose molecule and/or hemicellulose molecule.

[(A) Activation Step]

In the activation step (or pretreatment step), a cellulose is activated by treating with an acetylation solvent (solvent used in the acetylation step). Acetic acid is generally used as the acetylation solvent, but exemplary acetylation solvents usable herein further include methylene chloride and other solvents than acetic acid; and a solvent mixture of acetic acid with methylene chloride or another solvent than acetic acid. A material cellulose is generally supplied in the form of a sheet, and the sheet-like material cellulose is broken into pieces in dry manner and then subjected to an activation treatment (or pretreatment).

The activation step in the present invention is performed for a time (process time) of typically at least about 10 hr (600 minutes) or longer, preferably about 20 hr or longer, more preferably about 50 hr or longer, and furthermore preferably about 60 hr. The activation step, if performed for a time of extensively longer than 60 hr (e.g., 100 hr), may not give a cellulose having a desired molecular weight (degree of polymerization) and may often result in insufficient production efficiency. The activation step, if performed for a time shorter than 10 hr, may not give a cellulose having a sufficiently broad molecular weight distribution (high polydispersity), and may give a film having an insufficient rupture elongation, even when the subsequent esterification step (acetylation step) is optimized. According to the present invention, the pretreatment (activation step) is performed for a long time (at least 10 hr), whereby the cellulose before the acetylation reaction may advantageously have a low degree of polymerization (molecular weight). The use of such a cellulose having a low degree of polymerization may shorten the acetylation time for giving a cellulose acetate having a target degree of polymerization (viscosity). The polydispersity is narrowed with proceeding of a uniform depolymerization in the acetylation reaction. Accordingly, a cellulose acetate having a broader (higher) polydispersity than those obtained by customary methods can be obtained by pretreating a material cellulose for a longer time and carrying out an acetylation reaction of the pretreated cellulose for a short time to give a cellulose acetate having a target desired degree of polymerization (viscosity).

The acetylation solvent may be used in the activation step in an amount of typically from about 10 to about 100 parts by weight, and preferably from about 15 to about 60 parts by weight, per 100 parts by weight of the material cellulose. The activation step may be performed at a temperature of typically from about 10° C. to about 40° C. and preferably from about 15° C. to about 35° C.

[(B) Acetylation Step]

The activated cellulose obtained via the activation is acetylated with an acetylating agent in an acetylation solvent in the presence of an acetylation catalyst and thereby yields a cellulose acetate typified by a cellulose triacetate. The activated cellulose to be subjected to the acetylation step may be a mixture (blend) of pulps pretreated under different conditions. The mixture, when used, allows the ultimate product cellulose diacetate to have a broader polydispersity to thereby give a film having a higher elongation percentage.

Examples of the acetylation catalyst include strong acids, of which sulfuric acid is preferred. The acetylation catalyst typified by sulfuric acid may be used in the acetylation step in an amount of from about 1 to about 20 parts by weight per 100 parts by weight of the material cellulose. The amount herein is in terms of the total amount of the acetylation catalyst further including the amount of the acetylation catalyst used in the activation step. When sulfuric acid is used as the acetylation catalyst, the amount may be from about 7 to about 15 parts by weight, typically from about 7 to 14 parts by weight, preferably from about 8 to about 14 parts by weight, and more preferably from about 9 to about 14 parts by weight, per 100 parts by weight of the material cellulose.

The acetylating agent may be an acetyl halide such as acetyl chloride, but it is generally acetic anhydride. The acetylating agent is used in the acetylation step in an amount of typically from about 1.1 to about 4 equivalents, preferably from about 1.1 to about 2 equivalents, and more preferably from about 1.3 to about 1.8 equivalents, to hydroxyl groups of the cellulose. The acetylating agent may also be used in an amount of typically from 200 to 400 parts by weight and preferably from 230 to 350 parts by weight, per 100 parts by weight of the material cellulose.

Exemplary acetylation solvents include acetic acid and methylene chloride, as mentioned above. Two or more different solvents may be used in combination. For example, acetic acid and methylene chloride may be used in combination. The amount of acetylation solvents is typically from about 50 to about 700 parts by weight, preferably from about 100 to about 600 parts by weight, and more preferably from about 200 to about 500 parts by weight, per 100 parts by weight of the cellulose. Particularly, in the production of a cellulose triacetate, the amount of acetic acid as an acetylation solvent in the acetylation step is about 30 to about 500 parts by weight, preferably from about 80 to about 450 parts by weight, more preferably from about 150 to about 400 parts by weight, and particularly preferably from about 250 to about 380 parts by weight, per 100 parts by weight of the cellulose.

An acetylation reaction may be carried out under common conditions, for example, at temperatures of from about 0° C. to about 55° C., preferably from about 20° C. to about 50° C., and more preferably from about 30° C. to about 50° C. An acetylation reaction may be carried out at relatively low temperatures, such as 10° C. or lower (e.g., from 0° C. to 10° C.) in early stages. A duration of a reaction at such low temperatures may be, for example, about 30 minutes or longer, preferably from about 40 minutes to about 5 hours, and more preferably from about 60 to about 300 minutes, from the beginning of the acetylation reaction. The acetylation may be performed for a time (total acetylation time) of typically from 20 minutes to 36 hours, and preferably from 30 minutes to 20 hours, while the time may vary depending typically on the reaction temperature. In particular, the acetylation reaction is preferably at least performed at a temperature of from about 30° C. to about 50° C. for a time of from about 30 minutes to about 95 minutes. The acetylation time is important in the present invention. Specifically, the acetylation reaction is preferably performed for an acetylation time of 95 minutes or shorter to allow the resulting cellulose acetate to maintain a certain 6-percent viscosity (i.e., degree of polymerization).

The completion (or endpoint) of the acetylation reaction is also the beginning (starting point) of a hydrolysis reaction or alcoholysis reaction.

[(C) Acetylation-Reaction Terminating Step]

After the completion of the acetylation reaction, a reaction terminator is added to the reaction system so as to deactivate (quench) the acetylating agent remained in the reaction system. This operation deactivates or quenches at least the acetylating agent typified by an acid anhydride. The reaction terminator is not limited, as long as being capable of deactivating the acetylating agent and generally frequently contains at least water.

The reaction terminator may be composed typically of water and at least one selected from the group consisting of acetylation solvents (e.g., acetic acid), alcohols, and neutralizers. More specifically, exemplary reaction terminators include water alone; a mixture of water and acetic acid; a mixture of water and an alcohol; a mixture of water and a neutralizer; a mixture of water, acetic acid, and a neutralizer; and a mixture of water, acetic acid, an alcohol, and a neutralizer.

Exemplary neutralizers include basic substances such as alkali metal compounds and alkaline earth metal compounds. Exemplary alkali metal compounds include alkali metal hydroxides such as sodium hydroxide and potassium hydroxide; alkali metal carbonates such as sodium carbonate and potassium carbonate; alkali metal hydrogen carbonates such as sodium hydrogen carbonate; carboxylates of alkali metals, such as sodium acetate and potassium acetate; and sodium alkoxides such as sodium methoxide and sodium ethoxide. Exemplary alkaline earth metal compounds include alkaline earth metal hydroxides such as magnesium hydroxide and calcium hydroxide; alkaline earth metal carbonates such as magnesium carbonate and calcium carbonate; carboxylic acid salts of alkaline earth metals, such as magnesium acetate and calcium acetate; and alkaline earth metal alkoxides such as magnesium ethoxide. Of these neutralizers, alkaline earth metal compounds are preferred, of which magnesium acetate and other magnesium compounds are more preferred. Each of different neutralizers may be used alone or in combination. Such neutralizers act to neutralize part of the acetylation catalyst typified by sulfuric acid.

The acetylation-reaction termination is performed for a duration of shorter than 10 minutes, and more preferably shorter than 5 minutes. The acetylation-reaction termination, if performed for an excessively long duration, may give a cellulose diacetate having an excessively high degree of substitution at the 6-position. The resulting cellulose diacetate in this case includes less amounts of intermolecular hydrogen bonds derived from hydroxyl groups bonded to the glucose ring, and this may give a film having a low rupture elongation and exhibiting insufficient retardation after stretching.

[(D) Ripening Step (Hydrolysis Step)]

After terminating the acetylation reaction, the formed cellulose acetate [cellulose triacetate; a cellulose acetate having a total degree of acetyl substitution of 2.6 or more (2.6 to 3.0)] is subjected to ripening [hydrolysis (deacetylation)] in acetic acid, to thereby give a cellulose diacetate that has a controlled total degree of acetyl substitution and a controlled substitution distribution. In this reaction, the acetylation catalyst, typified by sulfuric acid, used in the acetylation and remained thereafter is partially neutralized, and the residual acetylation catalyst, typified by sulfuric acid, may be used as a ripening catalyst. Alternatively, all the residual acetylation catalyst, typified by sulfuric acid, remained after the acetylation may be used as a ripening catalyst without neutralization. In a preferred embodiment, the cellulose acetate (cellulose triacetate) is subjected to ripening [hydrolytic decomposition (deacetylation)] by the catalysis of a residual acetylation catalyst, typified by sulfuric acid, as a ripening catalyst. In the ripening, solvents and other components (e.g., acetic acid, methylene chloride, water, and an alcohol) may be added to the system according to necessity. Any of the neutralizers listed in the acetylation-reaction terminating step is preferably used herein.

In a preferred embodiment of the ripening step in production of the cellulose diacetate according to the present invention, the cellulose triacetate is hydrolyzed in acetic acid in the presence of an acetylation catalyst (ripening catalyst; typified by sulfuric acid) in an amount of from 0.56 to 8.44 parts by weight per 100 parts by weight of the cellulose triacetate and in the presence of water in an amount of 50 percent by mole or more and less than 65 percent by mole relative to the moles of the acetic acid at a temperature of from 40° C. to 90° C.

The amount of water in the ripening step (ripening water amount) may be typically 50 percent by mole or more and less than 65 percent by mole relative to the moles of the acetic acid. The presence of water in an amount of 50 percent by mole or more and less than 65 percent by mole relative to the acetic acid may give a cellulose diacetate having a not-so-high degree of acetyl substitution at the 6-position, thus being preferred. Water, if present in an amount of 65 percent by mole or more, may often cause the resulting cellulose diacetate to show poor filterability (high degree of filtration Kw). The acetylation catalyst for use herein is preferably sulfuric acid. The amounts of the acetylation catalyst and water are on the basis of the amounts at the beginning of the ripening reaction in a batch reaction, or are on the basis of the charging amounts in a continuous reaction.

The amount of acetic acid in the ripening step herein is preferably from about 56 to about 1125 parts by weight, more preferably from about 112 to about 844 parts by weight, and furthermore preferably from about 169 to about 563 parts by weight, per 100 parts by weight of the cellulose triacetate. Independently, the amount of acetic acid in the ripening step is preferably from about 100 to about 2000 parts by weight, more preferably from about 200 to about 1500 parts by weight, and furthermore preferably from about 300 to about 1000 parts by weight, per 100 parts by weight of the cellulose used as a starting material in the acetylation reaction.

The amount of the acetylation catalyst (ripening catalyst; typified by sulfuric acid) in the ripening step is typically from 0.56 to 8.44 parts by weight, more preferably from 0.56 to 5.63 parts by weight, furthermore preferably from 0.56 to 2.81 parts by weight, and particularly preferably from 1.69 to 2.81 parts by weight, per 100 parts by weight of the cellulose triacetate. Independently, the amount of the acetylation catalyst is preferably from 1 to 15 parts by weight, more preferably from 1 to 10 parts by weight, furthermore preferably from 1 to 5 parts by weight, and particularly preferably from 3 to 5 parts by weight, per 100 parts by weight of used as the starting material in the acetylation reaction. The acetylation catalyst (ripening catalyst), if used in an excessively small amount, may cause an excessively long hydrolysis time and thereby cause the resulting cellulose acetate to have an excessively low molecular weight. In contrast, the acetylation catalyst (ripening catalyst), if used in an excessively large amount, may cause a large variation (dispersion) of the depolymerization rate depending on the ripening temperature and thereby cause a large depolymerization rate even at relatively low ripening temperatures, and this may impede the production of a cellulose diacetate having a sufficiently high molecular weight.

In the production process of the cellulose diacetate, it is accepted that the reaction terminator is added to the reaction mixture after the completion of acetylation without isolating the produced cellulose triacetate therefrom; and a neutralizer is further added to the reaction mixture to neutralize part of the acetylation catalyst; the residual acetylation catalyst is used as a hydrolysis catalyst in the ripening step; and a predetermined amount of water is added before the ripening step. In this case, the amounts of the acetylation catalyst, acetic acid, and water per 100 parts by weight of the cellulose triacetate are values determined on the assumption that the material cellulose is thoroughly converted into a fully tri-substituted cellulose triacetate at the time when the acetylation step completes. The amounts of the acetylation catalyst, acetic acid, and water per 100 parts by weight of the cellulose triacetate are preferably calculated on the basis of the amount of material cellulose at the beginning of the acetylation step, and, in this case, the amounts (parts by weight) of the acetylation catalyst, acetic acid, and water per 100 parts by weight of the material cellulose are obtained by multiplying the amounts per 100 parts by weight of the cellulose triacetate by 1.777, respectively.

The amount (by weight) of an acetylation catalyst used in the ripening, on the basis of the material cellulose, is determined by subtracting the chemical equivalent of the acetylation catalyst fed to the reaction system from the chemical equivalent of the neutralizer fed to the reaction system, multiplying the resulting value by 1 gram-equivalent weight of the acetylation catalyst, and multiplying the resulting value by 1.777 as above.

Likewise, the amount (by weight) of water on the basis of the material cellulose is determined by calculating the total amount of water fed to the reaction system on or before the ripening step, such as water fed to the reaction system at the completion of the acetylation step, and water fed to the reaction system at the beginning of the ripening, and multiplying the total water amount by 1.777.

The amount (by weight) of acetic acid on the basis of the material cellulose is determined by adding the amount of acetic acid formed as a result of hydrolysis of acetic anhydride to the total amount of acetic acid fed to the reaction system in the pretreatment (activation step), acetylation step, and ripening step; and multiplying the resulting value by 1.777.

The ripening in the present invention is performed at a temperature (hydrolysis temperature) of typically from 40° C. to 90° C., preferably from 50° C. to 90° C., and more preferably from 60° C. to 90° C. (e.g., 65° C. to 90° C.). The ripening, if carried out at an excessively high temperature, may cause an excessively high depolymerization rate to give a cellulose acetate having an excessively low molecular weight, while this influence may vary depending on the amount of the acetylation catalyst. In contrast, the ripening, if carried out at an excessively low temperature, may cause an excessively low hydrolysis reaction rate, and this may often adversely affect the productivity.

[(E) Ripening-Reaction Terminating Step]

After the formation of a predetermined cellulose diacetate, the ripening reaction is terminated. Specifically, the neutralizer may be added according to necessity after the ripening (hydrolysis reaction or deacetylation). Of the neutralizers, the alkaline earth metal compounds are preferred, of which calcium hydroxide and other calcium compounds are more preferred. It is also accepted that the reaction product (a dope containing a cellulose diacetate) is poured into a precipitation solvent, such as water or an aqueous acetic acid solution, to form cellulose diacetate precipitates, the cellulose diacetate precipitates are separated, and subjected typically to washing with water to remove free metal components and sulfuric acid component. The washing with water may be conducted in the presence of the neutralizer. The above procedure reduces the formation of insoluble components and sparingly soluble components (e.g., unreacted cellulose and lowly acetylated cellulose) and suppresses the cellulose diacetate from decreasing in degree of polymerization.

[(F) Fractionation Step]

The cellulose diacetate obtained via the precedent step may be purified through fractionation. The fractionation helps the cellulose diacetate to have a further narrower half height width of acetylation distribution. The fractionation may be performed by the procedure described in JP-A No. H09-77801. The principle of this procedure is as follows. The cellulose diacetate is dissolved in a good solvent (e.g., methylene chloride) for a highly acetylated cellulose acetate, followed by centrifugal separation to give gelatinous precipitates. The gelatinous precipitates are washed with a good solvent (e.g., methyl alcohol) for a lowly acetylated cellulose acetate to thereby purify a cellulose diacetate component alone. In addition to, or instead of the centrifugal separation, the purification may be performed through microfiltration typically with a diatomaceous earth.

Specifically, the cellulose acetate is subjected to precipitation fractionation or dissolution fractionation in a solvent system having selectivities respectively for a highly acetylated component and a lowly acetylated component. Exemplary solvents having a high selective solubility for a highly acetylated component include methylene chlorides such as dichloromethane and chloroform. Exemplary solvents having a high selective solubility for a lowly acetylated component include methanol; and a 2:8 (by weight) mixture of acetone and methanol. Both the highly acetylated component and lowly acetylated component affects the formation of insoluble matter as described above, and it is important for the preparation of a sufficiently soluble cellulose acetate to remove the both components.

<Formation of Film>

A dope for film formation (filming) may be prepared by dissolving the cellulose diacetate in a suitable solvent such as methylene chloride or methanol. The dope is cast onto a substrate such as a glass plate typically using a bar coater at a temperature typically of 25° C. (room temperature), dried, separated from the substrate, and thereby yields a film. Where necessary, the separated film may be further dried. In this connection, leveling may be performed after casting to give a film (unstretched film) having a uniform surface. This film is further stretched and thereby yields a stretched film. The stretching may be performed according to a known procedure.

The film may further contain one or more plasticizers within a range not adversely affecting the advantageous effects of the present invention. Exemplary plasticizers include, but are not limited to, polycarboxylic acid ester plasticizers, glycolate plasticizers, phthalate plasticizer, fatty acid ester plasticizers, polyhydric alcohol ester plasticizers, polyester plasticizers, and acrylic plasticizers.

(Retardation of Film)

The film has an in-plane retardation of $R_e$ and a thickness-direction retardation of $R_{th}$. In the measurement of the in-plane retardation ($R_e$), the difference in refractive index between longitudinal and transverse directions in the plane is determined at a wavelength of 632.8 nm. The in-plane retardation ($R_e$) is a value obtained by multiplying the difference in refractive index by the thickness of the film and is determined according to following Expression (10):

$$R_e = (n_x - n_y) \times d \quad (10)$$

wherein $n_x$ represents the refractive index in the transverse direction (cross direction); $n_y$ represents the refractive index in the machine direction (longitudinal direction); and "d" represents the thickness of the film (nm). A smaller in-plane retardation ($R_e$) means higher optical isotropy (lower optical anisotropy) in the in-plane direction. The film preferably has an in-plane retardation ($R_e$) of from 0 to 300 nm; and stretching is a most simple way to control the in-plane retardation ($R_e$) freely according to the intended use within this range.

The thickness-direction retardation ($R_{th}$) of the film is a value obtained by determining a birefringence in the thickness-direction of the film at a wavelength of 632.8 nm and multiplying the birefringence by the thickness of the film and is determined according to following Expression (11):

$$R_{th} = \{(n_x + n_y)/2 - n_z\} \times d \quad (11)$$

wherein $n_x$ represents the refractive index in the transverse direction; $n_y$ represents the refractive index in the machine direction; $n_z$ represents the refractive index in the thickness direction; and "d" represents the thickness of the film (nm).

As used herein the term "thickness-direction retardation ($R_{th}$)" is defined according to Expression (12) below, in accordance typically with PTL 8. It should be noted that, in the technical field relating to birefringence, there are some cases where the thickness-direction retardation $R_{th}$ is defined in a different manner from that in $R_{th}$ as defined by Expression (12) and is indicated by an opposite sign. However, the thickness-direction retardation $R_{th}$ in the present invention is defined in accordance with the patent literature according to following Expression (12):

$$R_{th} = \{(n_x + n_y)/2 - n_z\} \times d \quad (12)$$

wherein $n_x$: the refractive index of the film in the cross direction (transverse direction);
$n_y$: the refractive index of the film in the longitudinal direction (machine direction);
$n_z$: the refractive index of the film in a thickness direction; and
d: the thickness of the film (nm)

The film in the present invention preferably has a positive thickness-direction retardation ($R_{th}$) with an absolute value of from 200 to 350 nm. The film generally has a thickness-direction retardation ($R_{th}$) of 200 nm or more and 350 nm or less, preferably 220 nm or more and 300 nm or less, and more preferably 240 nm or more and 280 nm or less as determined typically at a film thickness of 100 μm and a wavelength of 550 nm.

When the film is stretched in the longitudinal direction to control the in-plane retardation $R_e$ to give a plate (film) having an in-plane retardation $R_e$ of from 80 nm to 150 nm and a thickness-direction retardation $R_{th}$ of from 200 nm to 350 nm, the resulting plate (film) serves both as a λ/4 retarder and as a film for extending or improving the viewing angle.

(Rupture Elongation)

The rupture elongation is an elongation percentage (%) at break (rupture) of the prepared film upon pulling and is typically preferably 20% or more. The film, if having a rupture elongation of less than 20%, may have excessively low strength and may be not suitable for use as a retardation film.

EXAMPLES

The present invention will be illustrated in further detail with reference to several working examples below. It should be noted, however, that these examples are never construed to limit the scope of the present invention.

Example 1

A softwood prehydrolyzed kraft pulp having an α-cellulose content of 98.4 percent by weight was crushed into a flocculent pulp using a disk refiner. To 100 parts by weight of the crushed pulp (with a water content of 8%) was sprayed 26.8 parts by weight of acetic acid, stirred with each other thoroughly, and the mixture was pretreated and activated by being left stand for 60 hours (activation step). The activated pulp was added to a mixture containing 323 parts by weight of acetic acid, 245 parts by weight of acetic anhydride, and 13.1 parts by weight of sulfuric acid, the resulting mixture was raised in temperature from 5° C. to a highest temperature of 40° C. over 40 minutes, followed by acetylation for 90 minutes. A neutralizer (24% aqueous solution of magnesium acetate) was added over 3 minutes so as to regulate the amount of sulfuric acid (amount of sulfuric acid for ripening) to 2.5 parts by weight. Further, the reaction bath was raised in temperature to 75° C., water was added thereto to regulate the water (ripening water) concentration in the reaction bath to 52 percent by mole. The ripening water concentration was determined by multiplying the molar ratio of water to acetic acid in the reaction bath by 100 and was indicated in units of percent by mole. Ripening was then performed at 85° C. for 100 minutes, was terminated by neutralizing sulfuric acid with magnesium acetate, and thereby yielded a reaction mixture containing a cellulose diacetate. The resulting reaction mixture was combined with a diluted acetic acid aqueous solution to separate a cellulose diacetate, and the separated cellulose diacetate was washed with water, dried, stabilized with calcium hydroxide, and thereby yielded a target cellulose diacetate.

Examples 2 to 6, 8, 9, 12 to 13, and Comparative Examples 1 to 7, 9, 11 to 12

Table 1 shows preparation conditions of cellulose acetates. A series of cellulose diacetates was prepared by the procedure of Example 1 under the conditions given in Table 1.

TABLE 1

| Category | No. | Pretreatment time (hr) | Acetylation highest temperature (° C.) | Total acetylation time (min) | Neutralizer addition time (min) | Ripening water amount (percent by mole) | Ripening temperature (° C.) | Ripening time (min) |
|---|---|---|---|---|---|---|---|---|
| Example | 1 | 60 | 40 | 90 | 3 | 52 | 85 | 100 |
|  | 2 | 60 | 40 | 85 | 3 | 56 | 85 | 100 |
|  | 3 | 60 | 40 | 80 | 3 | 60 | 85 | 100 |
|  | 4 | 60 | 40 | 75 | 3 | 64 | 85 | 100 |
| Comparative | 1 | 60 | 40 | 110 | 3 | 44 | 85 | 100 |

TABLE 1-continued

| Category | No. | Pretreatment time (hr) | Acetylation highest temperature (° C.) | Total acetylation time (min) | Neutralizer addition time (min) | Ripening water amount (percent by mole) | Ripening temperature (° C.) | Ripening time (min) |
|---|---|---|---|---|---|---|---|---|
| Example | 2 | 60 | 40 | 100 | 3 | 46 | 85 | 100 |
|  | 3 | 60 | 40 | 95 | 3 | 48 | 85 | 100 |
|  | 4 | 60 | 40 | 55 | 3 | 67 | 85 | 100 |
| Example | 5 | 60 | 40 | 90 | 1 | 52 | 85 | 100 |
|  | 6 | 60 | 40 | 90 | 5 | 52 | 85 | 100 |
| Comparative Example | 5 | 60 | 40 | 90 | 1 | 68 | 80 | 150 |
|  | 6 | 60 | 40 | 90 | 20 | 52 | 85 | 100 |
| Example | 7 | fractionated product of cellulose acetate of Example 2 | | | | | | |
|  | 8 | 60 | 40 | 90 | 3 | 56 | 80 | 160 |
| Comparative Example | 7 | 60 | 40 | 90 | 3 | 56 | 75 | 210 |
|  | 8 | 60 | 40 | 85 | 3 | 56 | 85 | 130 |
|  | (mixture) | 60 | 40 | 85 | 3 | 56 | 85 | 70 |
| Example | 9 | 24 | 40 | 85 | 3 | 56 | 85 | 100 |
|  | 10 | 1:1 (by weight) mixture of cellulose acetates of Comparative Example 2 and Example 4 | | | | | | |
| Comparative Example | 9 | 1 | 40 | 100 | 3 | 56 | 85 | 100 |
|  | 10 | 1:1 (by weight) mixture of cellulose acetates of Comparative Example 1 and Comparative Example 4 | | | | | | |
| Example | 11 | stated separately | 40 | 75 | 3 | 56 | 85 | 100 |
| Example | 12 | 60 | 40 | 85 | 3 | 56 | 85 | 85 |
|  | 13 | 60 | 40 | 85 | 3 | 56 | 85 | 115 |
| Comparative | 11 | 60 | 40 | 85 | 3 | 56 | 85 | 72 |
| Example | 12 | 60 | 40 | 85 | 3 | 56 | 85 | 130 |

Example 7

Purification of Cellulose Diacetate

In 1,000 parts by weight of methylene chloride at room temperature (about 22° C.) was dispersed 100 parts by weight of the mixture containing the cellulose diacetate obtained from Example 2, followed by centrifugal separation under conditions at 15° C., at 8,000 rpm for 30 minutes to give gelatinous precipitates. The gelatinous precipitates were dispersed in 2,000 parts by weight of methanol, followed by centrifugal separation under the above conditions to give precipitates. The precipitates were washed twice with methanol, further washed twice with a 50 percent by weight aqueous acetone solution instead of methanol, and further washed twice each with 1,000 parts by weight of water. The resulting article was dried under reduced pressure at 40° C. until a constant weight was obtained, and thereby yielded 61 parts by weight of a purified cellulose diacetate.

Example 10

A 1:1 (by weight) mixture of the cellulose diacetates having different viscosities and being obtained via Comparative Example 2 and Example 4 was prepared.

Comparative Example 8

Two different cellulose acetates were synthesized under same conditions, except for carrying out ripening for durations of 130 minutes and 70 minutes, respectively, and a 1:1 (by weight) mixture of the two cellulose acetates was prepared. The two cellulose acetates had degrees of acetylation of 52.8% (ripening time: 130 minutes) and 57.8% (ripening time: 70 minutes), respectively.

Comparative Example 10

A 1:1 (by weight) mixture of the cellulose diacetates having different viscosities and being obtained via Comparative Example 1 and Comparative Example 4 was prepared.

Example 11

Blend of Pulps Pretreated Under Different Conditions (Pretreatment Condition 1) A softwood prehydrolyzed kraft pulp having an α-cellulose content of 98.4 percent by weight was crushed into a flocculent pulp using a disk refiner. To 100 parts by weight of the crushed pulp (with a water content of 8%) was sprayed 26.8 parts by weight of acetic acid, stirred with each other thoroughly, and the mixture was pretreated by being left stand for 60 hours.

(Pretreatment Condition 2) A softwood prehydrolyzed kraft pulp having an α-cellulose content of 98.4 percent by weight was crushed into a flocculent pulp using a disk refiner. To 100 parts by weight of the crushed pulp (with a water content of 8%) was sprayed 15.9 parts by weight of acetic acid, stirred thoroughly with each other, and 48.9 parts by weight of a mixture of sulfuric acid and acetic acid (sulfuric acid concentration of 3 percent by weight) was sprayed thereto, followed by stirring for 180 minutes.

A 1:1 (by weight) mixture of the pretreated pulps pretreated under the pretreatment condition 1 and the pretreatment condition 2 respectively was prepared. The mixture of the activated pulps was subjected to acetylation and ripening reactions by the procedure of Example 1 and thereby yielded a cellulose diacetate.

The cellulose diacetates obtained via the examples and comparative examples were subjected to measurements of the degree of acetylation, 6-percent viscosity, viscosity-average degree of polymerization, degree of substitution at the 6-position, half height width in the compositional distribution (half height width of acetylation distribution %), weight-average molecular weight Mw, polydispersity Mw/Mn, and degree of filtration Kw according to the following methods. The results are shown in Table 2.

<Degree of Acetylation>

The degree of acetylation of each of the cellulose diacetates obtained via the examples and comparative examples was determined by the method for measuring the degree of acetylation as prescribed in ASTM-D-817-91 (Test Methods of Testing Cellulose Acetate etc.). Conditions for a high-performance liquid chromatography analysis used in the measurement of degree of acetylation herein are as follows.

High-Performance Liquid Chromatography Conditions:
Eluent: Acetone/water/methanol (4/3/1, by volume) with gradient to acetone over 15 minutes
Column: PRP-1 (4.1×150 mm) supplied by Hamilton Company Temperature: 35° C.
Flow rate: 0.8 mL/min
Sample solution: 0.2% acetone solution
Injection volume: 10 μL
Detector: VAREX MK111 (at an evaporative tube temperature of 105° C. and a nitrogen flow rate of 2.4 L/min)
<6-Percent Viscosity>

In an Erlenmeyer flask were placed 3.00 g of a dried sample of each of the cellulose diacetates obtained via the examples and comparative examples and 39.90 g of a 95% aqueous acetone solution, and the flask was tightly stopped, followed by stirring for about one and a half hours. Then the sample was completely dissolved by shaking for one hour in a rotary shaker and thereby yielded a 6 weight/volume percent solution. The solution was transferred into a predetermined Ostwald viscometer up to the marker line, and the temperature of the solution was regulated at 25±1° C. for about 15 minutes. The flow time required to pass between time-marker lines was measured, and the 6-percent viscosity was calculated according to above-mentioned Expression (7):

$$6\text{-Percent viscosity(mPa·s)}=(\text{Flow time(s)})(\text{Viscometer coefficient}) \quad (7)$$

The viscometer coefficient was determined by measuring the flow time of a standard solution for viscometer calibration [supplied by SHOWA SHELL SEKIYU K.K. under the trade name "JS-200" (in accordance with JIS Z 8809)] by the above procedure, and calculating the viscometer coefficient according to above-mentioned Expression (8):

$$\text{Viscometer coefficient}=\{(\text{Absolute viscosity of standard solution(mPa·s)})\times(\text{Density of solution}(0.827 \text{ g/cm}^3))\}/\{(\text{Density of standard solution(g/cm}^3))\times(\text{Flow time of standard solution(second)})\} \quad (8)$$

<Viscosity-Average Degree of Polymerization>

Each of the cellulose diacetates obtained via the examples and comparative examples was dissolved in a 9:1 (by weight) mixture of methylene chloride and methanol to give a solution of a predetermined concentration "c" (2.00 g/L); the solution was injected into an Ostwald viscometer; and the flow time "t" in seconds of the solution required to pass between the viscometer graduations at 25° C. was measured. Independently, the flow time "$t_0$" in seconds of the solvent mixture alone was measured by the above procedure; and the viscosity-average degree of polymerization was calculated according to above-mentioned Expressions (4) to (6):

$$\eta_{rel}=t/t_0 \quad (4)$$

$$[\eta]=(\ln \eta_{rel})/c \quad (5)$$

$$DP=[\eta]/(6\times10^{-4}) \quad (6)$$

wherein "t" represents the flow time in seconds of the solution; "$t_0$" represents the flow time in seconds of the solvent; "c" represents the cellulose diacetate concentration (g/L) of the solution; $\eta_{rel}$ represents the relative viscosity; $[\eta]$ represents the intrinsic viscosity; and DP represents the average degree of polymerization.

<Degree of Substitution at 6-Position>

Hydroxyl groups of each of the cellulose diacetates obtained via the examples and comparative examples were propionylated with propionic anhydride in pyridine, the resulting sample was dissolved in deuterated chloroform and subjected to $^{13}$C-NMR spectral measurement. The respective degrees of acetyl substitution at the 2-, 3-, and 6-positions in the glucose ring of the original cellulose diacetate were determined based on abundance ratios between acetyl group and propionyl group at the corresponding positions, respectively.

<Half Height Width of Acetylation Distribution (%)>

The half height width of acetylation distribution (%) of each of the cellulose diacetates obtained via the examples and comparative examples was determined from a half height width in an elution curve obtained in the analysis of degree of acetylation as above. Specifically, a calibration curve was previously plotted as a quadratic function with respect to time using cellulose acetates having average degrees of acetylation of about 50%, 52%, 55%, and 60%, respectively, in which an elution peak time was plotted against an average degree of acetylation. From the elution curve of the sample, elution times at two points which give a half height to the peak height were determined, and degrees of acetylation corresponding to the elution times at the two points were calculated based on the calibration curve. The absolute value of the difference between the two calculated degrees of acetylation was defined as the half height width of acetylation distribution.

<Weight-Average Molecular Weight Mw, Number-Average Molecular Weight Mn, Polydispersity (Mw/Mn)>

Each of the cellulose diacetates were subjected to analysis by gel permeation chromatography (GPC) under the following conditions to measure a weight-average molecular weight Mw and a number-average molecular weight Mn, and based on the measured values, a polydispersity Mw/Mn was determined.

Solvent: Acetone
Column: Two GMHxl columns (Tosoh Corporation), with guard columns (Tosoh Corporation)
Flow rate: 0.8 mL/min
Temperature: 29° C.
Sample concentration: 0.25% (wt/vol)
Injection volume: 100 μL
Detector: Refractive index detector (RI)
Standard substance: Poly(methyl methacrylate)s PMMAs (molecular weights: 1890, 6820, 27600, 79500, 207400, 518900, and 772000)

<Kw (Degree of Filtration)>

The degree of filtration Kw was measured in the following manner.

A solution was prepared by dissolving each sample cellulose diacetate to a concentration of 20 percent by weight in a 95 percent by volume aqueous solution of acetone, and the solution was filtered through a given filter cloth at 30° C. to determine the amount of the filtrate passing through the cloth under a constant pressure (0.196 MPa). The degree of filtration (Kw) was calculated according to the following Expression (13). The given filter cloth is a filter cloth composed of two plies of a product supplied by Toyobo Co. Ltd. (product number 6570) and a single-sided flannel supplied by Yamanishi Senko K.K. sandwiched between them.

$$Kw=(2-P_2/P_1)\times10000/(P_1+P_2) \quad (13)$$

wherein $P_1$ is the amount (g) of the filtrate recovered for a period of 20 minutes after the initiation of the filtration; and $P_2$ is the amount (g) of the filtrate recovered for a period of 40 minutes ranging from 20 minutes after the initiation of the filtration to 60 minutes after the initiation of the filtration.

[Formation of Film]

In an airtight container were placed 15 parts by weight of each of the cellulose diacetates obtained via the examples and comparative examples, 72 parts by weight of methylene chloride, and 13 parts by weight of methanol, followed by gradual stirring over 24 hours to give a dope as a solution. The dope was filtrated under pressure and left stand for further 24 hours to remove bubbles from the dope.

The dope was then cast onto a glass plate using a bar coater at a dope temperature of 25° C. (room temperature). The glass plate bearing the cast dope was hermetically sealed and left <Retardations>

The thickness-direction retardation $R_{th}$ of the above-prepared unstretched film, and the in-plane retardation $R_e$ of the stretched film were measured with an ellipsometer (Ellipsometer AEP-100 (trade name) supplied by Shimadzu Corporation). The results are shown in Table 2.

TABLE 2

| Category | No. | Degree of acetylation (%) | 6-Percent viscosity (mPa·s) | Viscosity-average degree of polymerization | Degree of substitution at 6 position | Half height width of compositional distribution (degree of acetylation %) | Mw (×10⁴) | Poly-dispersity Mw/Mn | Kw | Rth (nm) | Rupture elongation (%) | Re (nm) |
|---|---|---|---|---|---|---|---|---|---|---|---|---|
| Example | 1 | 55.4 | 129 | 187 | 0.75 | 2.0 | 21.0 | 4.7 | 110 | 310 | 24 | 76 |
|  | 2 | 55.3 | 150 | 194 | 0.75 | 2.1 | 21.7 | 5.1 | 121 | 280 | 33 | 110 |
|  | 3 | 55.3 | 170 | 199 | 0.74 | 2.2 | 22.3 | 5.2 | 128 | 290 | 33 | 110 |
|  | 4 | 55.3 | 210 | 208 | 0.77 | 2.1 | 23.3 | 4.9 | 180 | 290 | 35 | 117 |
| Comparative | 1 | 55.3 | 60 | 154 | 0.75 | 2.2 | 17.3 | 5.0 | 77 | 300 | 14 | 47 |
| Example | 2 | 55.3 | 90 | 172 | 0.75 | 2.1 | 19.3 | 5.1 | 89 | 290 | 17 | 57 |
|  | 3 | 55.2 | 112 | 181 | 0.74 | 2.1 | 20.3 | 5.0 | 104 | 300 | 19 | 67 |
|  | 4 | 55.3 | 240 | 214 | 0.76 | 2.1 | 24.0 | 5.1 | 290 | 280 | 18 | 60 |
| Example | 5 | 55.3 | 150 | 194 | 0.68 | 2.2 | 21.7 | 5.1 | 107 | 290 | 39 | 130 |
|  | 6 | 55.4 | 150 | 194 | 0.83 | 2.1 | 21.7 | 4.9 | 140 | 290 | 31 | 99 |
| Comparative | 5 | 55.3 | 150 | 194 | 0.61 | 2.1 | 21.7 | 5.2 | 310 | 280 | 19 | 63 |
| Example | 6 | 55.3 | 150 | 194 | 0.91 | 2.0 | 21.7 | 5.3 | 190 | 300 | 18 | 60 |
| Example | 7 | 55.3 | 150 | 194 | 0.76 | 1.1 | 21.7 | 4.8 | 90 | 300 | 55 | 183 |
|  | 8 | 55.3 | 150 | 194 | 0.75 | 2.3 | 21.7 | 5.2 | 115 | 280 | 29 | 97 |
| Comparative | 7 | 55.4 | 150 | 194 | 0.76 | 2.5 | 21.7 | 5.1 | 118 | 290 | 19 | 59 |
| Example | 8 (mixture) | 55.3 | 150 | 194 | 0.74 | 3.9 | 21.7 | 5.0 | 131 | 300 290 | 16 | 53 |
| Example | 9 | 55.3 | 150 | 194 | 0.74 | 2.1 | 21.7 | 3.2 | 112 | 290 | 26 | 87 |
|  | 10 | 55.3 | 150 | 194 | 0.75 | 2.1 | 21.7 | 6.0 | 140 | 290 | 51 | 170 |
| Comparative | 9 | 55.3 | 150 | 194 | 0.76 | 2.1 | 21.7 | 2.8 | 128 | 310 | 17 | 57 |
| Example | 10 | 55.3 | 150 | 194 | 0.75 | 2.1 | 21.7 | 8.1 | 210 | 310 | 19 | 63 |
| Example | 11 | 55.3 | 150 | 194 | 0.75 | 2.1 | 21.7 | 7.2 | 86 | 300 | 54 | 200 |
| Example | 12 | 56.5 | 169 | 199 | 0.78 | 1.9 | 21.7 | 5.1 | 121 | 240 | 33 | 62 |
|  | 13 | 53.9 | 132 | 188 | 0.72 | 2.2 | 21.1 | 5.0 | 110 | 360 | 31 | 159 |
| Comparative | 11 | 57.5 | 175 | 200 | 0.80 | 1.8 | 22.9 | 5.2 | 109 | 190 | 33 | 22 |
| Example | 12 | 52.8 | 111 | 181 | 0.69 | 2.3 | 20.8 | 5.1 | 119 | 420 | 26 | 187 | stand for 2 minutes to uniformize (level) the surface of a film of dope. After the leveling, the film on the glass plate was dried in a hot-air drier at 40° C. for 8 minutes and was peeled off from the glass plate. The film was supported by a stainless steel frame, dried in a hot-air drier at 100° C. for 20 minutes, and thereby yielded a film (unstretched film). The unstretched film had a thickness of 80 µm.

The rupture elongation and retardations of the above-prepared film were measured in the following manner.

<Measurement of Rupture Elongation>

A sample was dissolved in a 9:1 (by weight) mixture of methylene chloride and methanol to give a solution having a solids concentration of 15 percent by weight. The solution was cast onto a glass plate using a bar coater and thereby yielded a film having a thickness of from 75 to 85 µm thereon. The film was pulled at a tensile speed of 5 cm/minute at room temperature (about 22° C.) using a tensile tester (supplied by ORIENTEC Co., Ltd., "UCT-5T") and an environment unit (supplied by ORIENTEC Co., Ltd., "TLF-U3"), and an elongation percentage (%) at the time when the film ruptured was determined. The results are shown in Table 2.

<Stretching>

The above-prepared film (unstretched film) was stretched in the casting direction of the film sample at room temperature (about 22° C.) to an elongation percentage being 90% of the rupture elongation using the tensile tester (supplied by ORIENTEC Co., Ltd., "UCT-5T") and the environment unit (supplied by ORIENTEC Co., Ltd., "TLF-U3"). The film after stretching had a thickness of 65 µm.

The films according to the examples each had a large thickness-direction retardation $R_{th}$ and a large rupture elongation. In contrast, the films obtained according to Comparative Examples 1 to 3 had a low viscosity and a low rupture elongation. The cellulose diacetate according to Comparative Example 4 contained a large amount of unreacted cellulose and gave a film showing a large degree of filtration Kw (poor filterability). In addition, the film had a low rupture elongation, typically because the unreacted cellulose was not dissolved uniformly in the solvent for the dope for filming. In Comparative Example 5, the ripening bath had such an excessively large water amount as to be a system which facilitates a cellulose diacetate to precipitate, and this caused the reaction to be ununiform. In addition, the resulting film had a large degree of filtration (poor filterability) and had a low rupture elongation. The cellulose diacetate according to Comparative Example 6 contained smaller amounts of hydrogen bonds derived from hydroxyl groups at the 6-position and thereby gave a film having a low rupture elongation. The cellulose diacetate according to Comparative Example 7 had a broad half height width of acetylation distribution, and gave a film having a low rupture elongation. The cellulose diacetate according to Comparative Example 8 was a blend of cellulose acetates having different degrees of substitution, showed a broad half height width of acetylation distribution, and gave a film having a low rupture elongation. The cellulose diacetate according to Comparative Example 10 was a blend of cellulose acetates having different viscosities (60 mPa·s and 240 mPa·s) and gave a film having a low rupture elongation due to unreacted components.

INDUSTRIAL APPLICABILITY

The cellulose diacetate for a retardation film according to the present invention exhibits satisfactory stretchability, develops satisfactory retardation when being stretched, shows good filterability, and less suffers from optical foreign particles such as bright-spot foreign particles contained therein. The cellulose diacetate gives a protective film for a polarizer which meets the demands on thickness reduction and more sophisticated performance and which is to be used typically in display devices such as liquid crystal display devices typically for slim, lightweight laptop computers.

The invention claimed is:

1. A cellulose diacetate for a retardation film, the cellulose diacetate having a total degree of acetyl substitution of from 2.27 to 2.56, wherein the cellulose diacetate has
   a polydispersity Mw/Mn of $3<Mw/Mn\leq7.5$,
   a degree of substitution at the 6-position of from 0.65 to 0.85,
   a half height width of acetylation distribution of from 1.0 to 2.3, said half height width of acetylation distribution being a width of an intermolecular acetylation distribution curve at a height which is half the peak height in the intermolecular acetylation distribution curve plotted with the abscissa indicating a degree of acetylation of the cellulose diacetate and the ordinate indicating an amount of the cellulose diacetate at the degree of acetylation, and
   a viscosity-average degree of polymerization from 182 to 213.

2. The cellulose diacetate for a retardation film, according to claim 1, wherein the cellulose diacetate has a 6-percent viscosity of from 120 to 230 mPa·s.

3. The cellulose diacetate for a retardation film, according to claim 1 or 2, wherein the cellulose diacetate has a weight-average molecular weight Mw of 205,000 to 235,000.

4. The cellulose diacetate for a retardation film according to claim 1, wherein the cellulose diacetate has a degree of filtration Kw of 50 to 200.

* * * * *